June 13, 1961     E. R. DIETRICH     2,988,353
PNEUMATIC SPRING CONSTRUCTION
Filed May 9, 1957     2 Sheets-Sheet 1

INVENTOR.
Eric R. Dietrich
BY W. S. Pettigrew
ATTORNEY

June 13, 1961  E. R. DIETRICH  2,988,353
PNEUMATIC SPRING CONSTRUCTION
Filed May 9, 1957  2 Sheets-Sheet 2

INVENTOR.
Eric R. Dietrich
BY
W. Pettigrew
ATTORNEY

United States Patent Office 2,988,353
Patented June 13, 1961

2,988,353
PNEUMATIC SPRING CONSTRUCTION
Eric R. Dietrich, Lapeer, Mich., assignor to General Motors Corporation, Detroit, Mich., a corporation of Delaware
Filed May 9, 1957, Ser. No. 658,197
11 Claims. (Cl. 267—65)

This invention relates to air springs and more particularly to air springs employing a flexible diaphragm.

An object of the present invention is to provide an improved air spring construction.

A further object is to provide a diaphragm type air spring which is so constructed and arranged as to substantially extend the operational life of the diaphragm.

Another object is to provide an air spring of the type having a pair of relatively movable rigid members coacting with a flexible diaphragm, wherein certain portions of the exposed surface of one or both rigid members is provided with means for preventing accumulation of mud or other abrasive coating on the exposed surfaces thereby reducing rubbing of the diaphragm wall.

Still a further object is to provide an air spring of the type having an air confining cylinder with a flexible diaphragm extending over the open end thereof with a reciprocable piston engaging the central portion of the diaphragm, wherein the piston skirt is provided with a flexible peripheral band for preventing progressive build-up of abrasive foreign matter on the portion of the piston skirt which is alternately exposed to the elements and overlapped by the diaphragm wall.

These and other objects, advantages and features of the invention will become more fully apparent as reference is had to the accompanying specification and drawings wherein.

Figure 1:
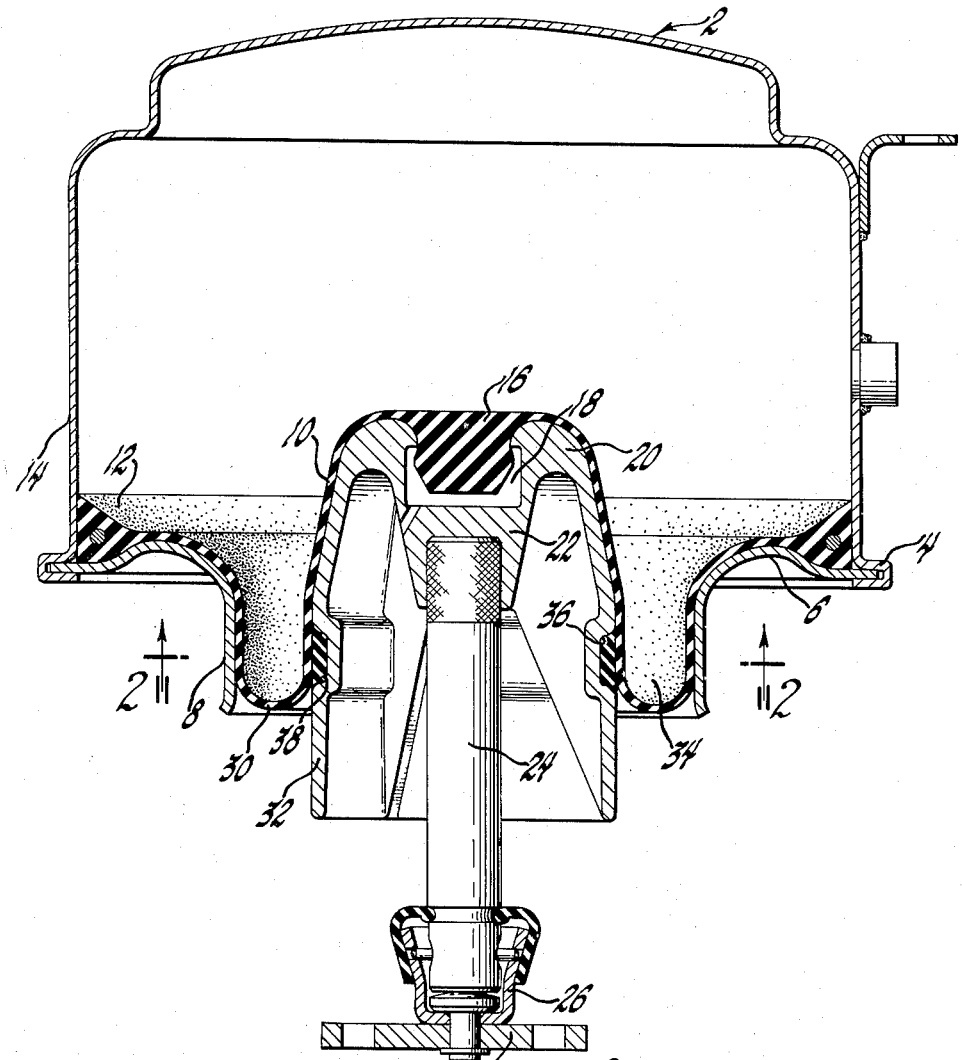
FIG. 1 is a sectional view of an air spring assembly employing the present invention.
Figure 2:
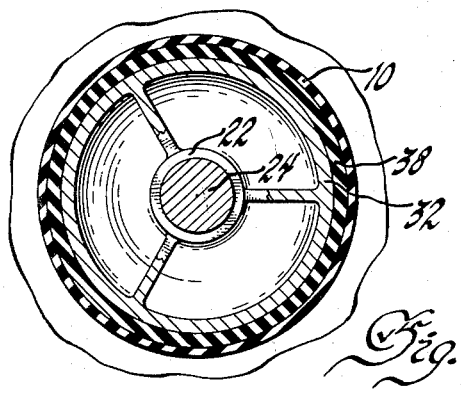
FIG. 2 is a fragmentary sectional view looking in the direction of arrows 2—2 of FIG. 1.

The invention is generally applicable to air springs of the type employing coaxially arranged piston and cylinder members in which a flexible diaphragm is interposed therebetween and adapted for varying degrees of overlapping relationship with the skirt or peripheral side wall of the piston, depending upon the vertical displacement thereof relative to the cylinder. In the preferred embodiment shown in FIG. 1, reference numeral 2 designates generally a rigid dome-shaped air confining cylinder which is attached in any suitable manner to the sprung portion of a vehicle, not shown. At its lower extremity cylinder 2 is provided with an integral peripheral C-shaped flange 4 in which is disposed an annular diaphragm retainer plate 6 having a depending skirt 8. Disposed in dome 2 is a flexible diaphragm 10 having an enlarged outer peripheral bead 12 supported at the juncture of vertical wall portion 14 of dome 2 and retainer plate 6. Centrally thereof diaphragm 10 is provided with a depending bulged portion 16 which is adapted for snap-in engagement in a relieved bore 18 formed in the top of piston 20. Piston 20 is maintained in generally concentric relation with retainer plate skirt 8 by virtue of the guiding influence of diaphragm 10. Press fitted in a central depending portion 22 of piston 20 is a piston rod 24, the lower end of which is pivotally connected at 26 to a bracket 28. Bracket 28, in turn, is rigidly attached in any convenient manner to the usual vehicle wheel supporting arm, not shown.

As will be evident from FIG. 1, the intermediate portion 30 of diaphragm 10 between retainer skirt 8 and piston skirt 32 assumes a single depending convolution which normally occupies the annular space 34 therebetween. Because of the variation in vertical wheel oscillation, vertical displacement of piston 20 varies more or less continuously from the normal static load position shown. Consequently, a major portion of piston skirt 32 is more or less continuously exposed to the elements and therefore subjected to gradual deposit of mud and other abrasive accumulation. In practice, it has been found that such accumulation builds up irregularly and becomes extremely hard. As a result the originally smooth piston skirt wall becomes progresisvely more irregular and causes an abrading and chafing of the relatively thin wall section of intermediate portion 30 of diaphragm 10, thus considerably shortening the service life thereof.

In order to prevent build-up of such abrasive accumulation in accordance with the present invention, an annular recess 36 is formed in the outer peripheral wall of the piston and has disposed therein, as by bonding, an annular elastomeric band 38, the outside diameter of which is equal to or slightly greater than the outside diameter of the piston wall. During normal vertical piston oscillation, band 38 is alternately exposed and overlapped by the intermediate portion 30 of diaphragm 10. To the extent that any coating is deposited on band 38 during momentary exposure to the elements, subsequent overlapping engagement by portion 30 of diaphragm 10 flexes band 38 thereby preventing permanent encrustation from forming thereon. As a result, the critical vertical wall section of the piston is maintained vertually free of abrasive coating and the likelihood of abrasive action on the diaphragm reduced to a minimum. It will of course be understood that the precise location of the vertical level in which the band 38 is located on the piston and the width thereof will depend upon initial spring design factors such as the normal range of piston oscillation and design height position of the piston under static load condition. Obviously, band 38 might also extend throughout the entire vertical length of the piston. However, since virtually all piston oscillation is confined to a relatively shallow range. Only a relatively shallow flexible band 38 will be required in a normal installation.

Figure 3:
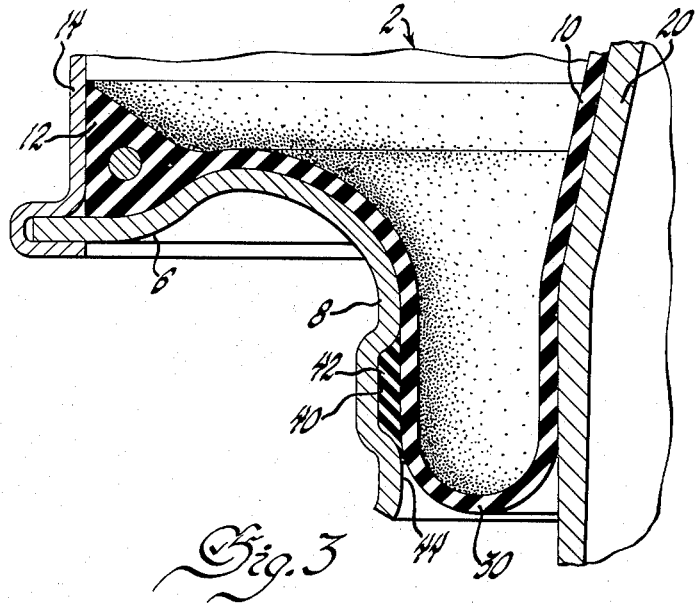
FIG. 3 is an enlarged fragmentary sectional view of a modified form of the invention.

In the modification shown in FIG. 3, the depending skirt 8 of diaphragm retainer 6 is formed with a circumferential outwardly deformed recess 40 similar to recess 36 described in connection with piston 20 in the embodiment of FIG. 1. Recess 40 is similarly provided with a circumferential elastomeric band 42, the function of which is similar to band 38 in the construction of FIG. 1. It will, of course, be evident that the normal range of vertical piston displacement will occasion periodic exposure of the inner wall portion 44 of skirt 8 and thus give rise to the possibility of a similar build-up of abrasive coating thereon. Needless to say, both of the forms just described may be combined in a single spring construction if desired.

Figure 4:
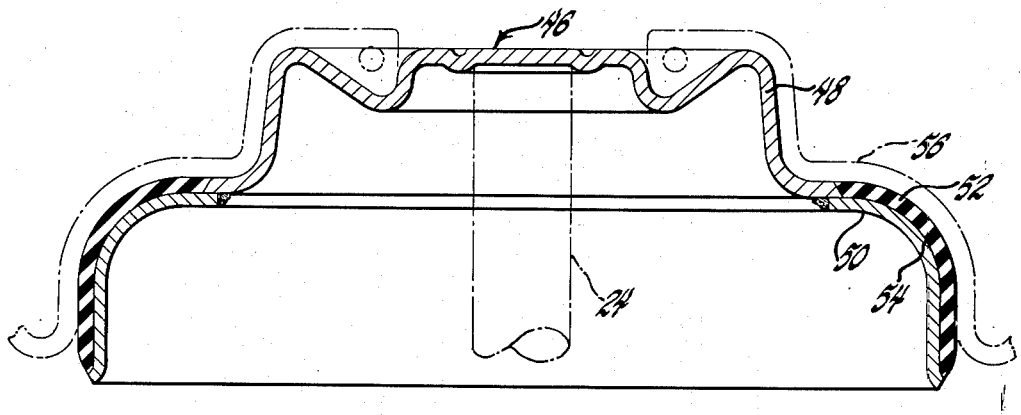
FIG. 4 is a sectional view of a piston showing another modification of the invention.

FIG. 4 shows a still further modification of the invention as applied to a sheet metal piston 46 of relatively shallow depth. In this construction piston 46 is formed of two abutting annular parts 48 and 50 which are welded in concentric relation to form an inverted cup-shaped member. The piston as so formed is intended to function in exactly the same manner as piston 20 of the embodiment of FIG. 1. Because of the method of fabricating piston 46, the resulting structure is particularly suitable for application of the present invention. It will be seen in FIG. 4 that when members 48 and 50 are welded together there is initially an offset relationship between their respective outer contours. However, subsequent application of a circumferential band of elastomeric material 52 over the outer periphery 54 in part 50 causes smooth blending of the entire outer surface of both parts. Hence, no sharp irregular surfaces are presented for engagement with the diaphragm wall 56.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:

1. An air spring comprising a cylinder having an open end, a piston reciprocable in said cylinder, a flexible diaphragm extending across the open end of said cylinder and engaging said piston, said diaphragm having an intermediate folded wall portion normally overlapping a portion of said piston, and flexible means on said piston located at a level on the latter which is periodically engaged by said folded wall portion upon reciprocable movement of said piston through the normal range of deflection thereof.

2. An air spring comprising a cylinder having an open end, a piston having depending side wall, a single convolution flexible diaphragm extending across the open end of said cylinder and having its central portion connected to said piston, the single convolution of said diaphragm being normally disposed to overlap a portion of said side wall, and flexible means on said side wall positioned to periodically engage said folded wall portion upon oscillation of said piston.

3. In an air spring, a cylinder having a flexible diaphragm disposed over the open end thereof, a piston engaging said diaphragm and reciprocable relative to said cylinder so that the wall of said piston is alternately exposed to the elements and overlapped by said diaphragm, and flexible means on said wall periodically engageable by said diaphragm to prevent abrading of the latter by accumulation of foreign matter on said piston wall.

4. In an air spring, a cylinder having a flexible diaphragm disposed over the open end thereof, a piston having a cylindrical wall, said piston engaging the central portion of said diaphragm and being guided thereby for reciprocable movement relative to said cylinder so that the peripheral wall of said piston is alternately exposed to the elements and overlapped by said diaphragm, and flexible means on said wall intermittently engageable by said diaphragm to prevent abrading of the latter by accumualtion of foreign matter on said piston wall.

5. In an air spring, a cylinder having a flexible diaphragm disposed over the open end thereof, a piston having a cylindrical wall, said piston engaging the central portion of said diaphragm and being guided thereby for reciprocable movement relative to said cylinder so that the peripheral wall of said piston is alternately exposed to the elements and overlapped by said diaphragm, and annular flexible means on said wall engageable by said diaphgram to prevent abrading of the latter by accumulation of foreign matter on said piston wall.

6. In an air spring, a cylinder having a flexible diaphragm disposed over the open end thereof, a piston having a cylindrical wall, said piston engaging the central portion of said diaphragm and being guided thereby for reciprocable movement relative to said cylinder so that the peripheral wall of said piston is alternately exposed to the elements and overlapped by said diaphragm, and annular flexible means bonded on said wall engageable by said diaphragm to prevent abrading of the latter by accumulation of foreign matter on said piston wall.

7. In an air spring, a cylinder having a flexible diaphragm disposed over the open end thereof, a cylindrical piston engaging said diaphragm and reciprocable relative to said cylinder so that a portion of the peripheral wall of said piston is alternately exposed to the elements and overlapped by said diaphragm, a circumferential groove formed in said last mentioned portion, and flexible means disposed in said groove for engagement by said diaphragm to prevent abrading of said diaphgram by accumulation of foreign matter on said piston wall.

8. An air spring comprising a cylinder having a depending skirt, a piston adapted for reciprocation in said cylinder, said piston having a depending skirt of smaller diameter than said cylinder skirt, a diaphragm supported in said cylinder and engaged centrally by said piston, said diaphragm having a single convolution intermediate portion overlapping at least one of said skirts in varying degrees according to the vertical travel of said piston, and a resilient band formed on at least one of said skirts at a vertical level periodically overlapped by said diaphragm, said band being adapted to flex under diaphragm pressure to prevent accumulation of diaphragm abrading foreign matter.

9. An air spring comprising a cylinder having a depending annular skirt, a piston adapted for reciprocation in said cylinder, said piston having a depending annular skirt of smaller diameter than said cylinder skirt, a diaphragm supported in said cylinder and engaged centrally by said piston, said diaphragm having a single convolution intermediate portion overlapping at least one of said skirts in varying degrees according to the vertical travel of said piston, and a resilient band formed on at least one of said skirts at a vertical level periodically overlapped by said diaphragm, said band being adapted to flex under diaphragm pressure to prevent accumulation of diaphragm abrading foreign matter.

10. An air spring comprising a cylinder having a depending annular skirt, a piston adapted for reciprocation in said cylinder, said piston having a depending annular skirt of smaller diameter than said cylinder skirt, a diaphragm supported in said cylinder and engaged centrally by said piston, said diaphragm having a single convolution intermediate portion overlapping the inner wall of said cylinder skirt and outer wall of said piston skirt in varying degrees according to the vertical travel of said piston, and a resilient band formed on both of said skirts at a vertical level periodically overlapped by said diaphragm, said band being adapted to flex under diaphragm pressure to prevent accumulation of diaphragm abrading foreign matter.

11. An air spring comprising a cylinder having a depending skirt, a piston adapted for reciprocation in said cylinder, said piston having a depending skirt of smaller diameter than said cylinder skirt, a diaphragm supported in said cylinder and engaged by said piston, said diaphragm having a single convolution intermediate portion overlapping said piston skirt in varying degrees according to the vertical travel of said piston, said piston skirt having a circumferential groove formed therein at a level periodically overlapped by said diaphragm, and a resilient band disposed in said groove for preventing adherence of diaphragm abrading deposit.

References Cited in the file of this patent

UNITED STATES PATENTS

| 1,133,337 | Tinkham | Mar. 30, 1915 |
| 2,180,128 | Stancliffe | Nov. 14, 1939 |

FOREIGN PATENTS

| 17,813 | Great Britain | July 28, 1914 |